United States Patent
White et al.

(10) Patent No.: US 8,001,848 B2
(45) Date of Patent: Aug. 23, 2011

(54) TORQUE MEASUREMENT METHOD AND APPARATUS

(75) Inventors: Robert J. White, Waterloo, IA (US); Timothy J. Kilworth, Waverly, IA (US)

(73) Assignee: Deere & Company, Moline, IL (US)

( * ) Notice: Subject to any disclaimer, the term of this patent is extended or adjusted under 35 U.S.C. 154(b) by 204 days.

(21) Appl. No.: 11/958,707

(22) Filed: Dec. 18, 2007

(65) Prior Publication Data

US 2009/0151476 A1    Jun. 18, 2009

(51) Int. Cl.
*G01L 3/00* (2006.01)
*G01L 3/14* (2006.01)

(52) U.S. Cl. ......... 73/862.327; 73/862.325; 73/862.191; 73/862.321

(58) Field of Classification Search ............. 73/862.326–862.339, 862.657
See application file for complete search history.

(56) References Cited

U.S. PATENT DOCUMENTS

| | | | | |
|---|---|---|---|---|
| 3,871,215 A | * | 3/1975 | Pratt et al. | 73/862.324 |
| 4,592,241 A | * | 6/1986 | Obayashi et al. | 73/862.328 |
| 4,627,297 A | * | 12/1986 | Akimoto | 73/862.324 |
| 4,783,998 A | * | 11/1988 | Sander | 73/660 |
| 4,787,255 A | * | 11/1988 | Guay | 73/862.326 |
| 4,918,997 A | * | 4/1990 | Pouillange | 73/862.327 |
| 4,979,398 A | * | 12/1990 | Goodzey et al. | 73/862.326 |
| 5,031,459 A | * | 7/1991 | Twerdochlib | 73/650 |
| 5,067,354 A | * | 11/1991 | Kawai | 73/862.328 |
| 5,067,355 A | * | 11/1991 | Witte | 73/862.326 |
| 5,265,480 A | * | 11/1993 | Tsuji et al. | 73/862.325 |
| 5,301,559 A | * | 4/1994 | Tsuji et al. | 73/862.326 |
| 5,438,882 A | * | 8/1995 | Karim-Panahi et al. | 73/862.324 |
| 5,596,153 A | | 1/1997 | Bulgrien et al. | 73/862.326 |

(Continued)

FOREIGN PATENT DOCUMENTS

GB    1503592    3/1978

OTHER PUBLICATIONS

Kirsten et al. "Undersampling reduces data-acquistion costs for select applications" The EDN designer's companion. Hickman et al. Published 1994. pp. 109-111.*

(Continued)

*Primary Examiner* — Lisa M Caputo
*Assistant Examiner* — Jonathan Dunlap

(57) ABSTRACT

A torque measurement device associated with a power driven ground engaging device having a power supplying device and a load. The torque measurement device includes a rotatable shaft, a first detectable feature, a second detectable feature, a plurality of sensors and an electrical controller. The rotatable shaft has a longitudinal axis, a first end and a second end. The first end is connected to the power supplying device and the second end is connected to the load. The first and second detectable features are respectively associated with a first longitudinal position and a second longitudinal position on the shaft. The plurality of sensors include a first sensor and a second sensor. The first sensor is proximate to the first detectable feature and the second sensor is proximate to the second detectable feature. The first sensor produces a first signal and the second sensor produces a second signal as the rotatable shaft rotates about the longitudinal axis. The electrical controller samples the first signal and the second signal at a sampling rate. The first signal has a first frequency and the sampling rate is less than twice the first frequency. The electrical controller computes a torque measurement representative of the torque on the rotatable shaft utilizing the first signal and the second signal.

7 Claims, 3 Drawing Sheets

U.S. PATENT DOCUMENTS

| | | | |
|---|---|---|---|
| 6,129,187 A | 10/2000 | Bellanger et al. | 192/3.58 |
| 6,745,621 B1* | 6/2004 | Le Roux Cilliers et al. | 73/112.01 |
| 6,935,193 B2* | 8/2005 | Heisenberg et al. | 73/862.324 |
| 7,104,133 B2* | 9/2006 | Kuroda et al. | 73/862.324 |
| 7,423,424 B2* | 9/2008 | Hoelzl et al. | 324/240 |
| 2002/0000129 A1* | 1/2002 | Madni et al. | 73/862.326 |
| 2003/0102181 A1* | 6/2003 | Tokumoto | 180/446 |

OTHER PUBLICATIONS

Li, Xen. "Fourier Analysis" Wiley Encyclopedia of Electrical and Electronics Engineering. Available online Dec. 27, 1999. Accessed online Mar. 22, 2010. <http://mrw.interscience.wiley.com/emrw/9780471346081/eeee/article/W2416/current/pdf>.*

European Search Report, 8 pages, Nov. 12, 2010.

* cited by examiner

TORQUE MEASUREMENT METHOD AND APPARATUS

FIELD OF THE INVENTION

The present invention relates to a torque measurement apparatus, and, more particularly to a torque measurement apparatus utilized a controller sampling an aliased signal.

BACKGROUND OF THE INVENTION

In work vehicles, such as agricultural machines, the engine's power is directed to several aspects of the agriculture machine and the directing of the power is often done by way of rotating shafts. The torque supplied by the engine is often directed through a transmission system that may be utilized to multiply the torque applied to a load. The capacity of the engine in supplying power to the load may exceed the capacity of the shaft or that of a subsequently driven item if the load becomes too great. It is known to measure the torque by way of a drive plate that has retaining springs through which the torque is transmitted from the drive plate to a driven plate. The differential position between the drive plate and the driven plate, as torque is transmitted through springs connecting the two, is utilized to compute the torque being applied by way of the drive plate/driven plate arrangement. As torque is transmitted through the plate, the springs are compressed and fingers extending from the driven plate move relative to a reference on the driven plate. This difference then is detectable by a sensor and the information is conveyed to a display system for information to the operator of the agricultural machine. An example of this sort of measurement device is contained in U.S. Pat. No. 5,596,153, which includes a device for the measurement of engine rpm and torque transmitted through the drive plate to the driven plate.

SUMMARY OF THE INVENTION

The present invention relates to a torque measurement apparatus and method that utilizes a controller sampling an aliased signal to measure torque on at least one drive component in an agricultural vehicle.

The invention in one form consists of a torque measurement apparatus associated with a power driven ground engaging device having a power supply and a load. The torque measurement apparatus includes a rotatable shaft, a first detectable feature, a second detectable feature, a plurality of sensors and a controller. The rotatable shaft has a longitudinal axis, a first end and a second end. The first end is connected to the power supply and the second end is connected to the load. The first and second detectable features are respectively associated with a first longitudinal position and a second longitudinal position on the shaft. The plurality of sensors include a first sensor and a second sensor. The first sensor is proximate to the first detectable feature and the second sensor is proximate to the second detectable feature. The first sensor produces a first signal and the second sensor produces a second signal as the rotatable shaft rotates about the longitudinal axis. The controller samples the first signal and the second signal at a sampling rate. The first signal has a first frequency and the sampling rate is less than twice the first frequency. The controller computes a torque measurement representative of the torque on the rotatable shaft utilizing the first signal and the second signal.

DETAILED DESCRIPTION OF THE INVENTION

Figure 1:
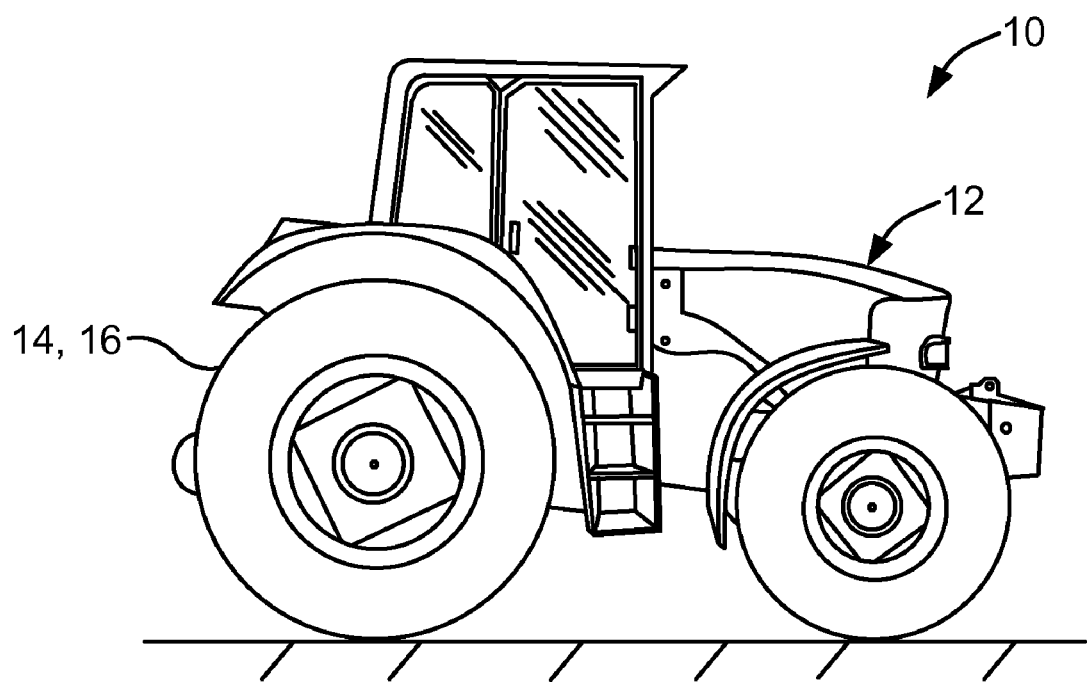
FIG. 1 is a side view of a tractor utilizing the apparatus and method of the present invention.
Figure 2:
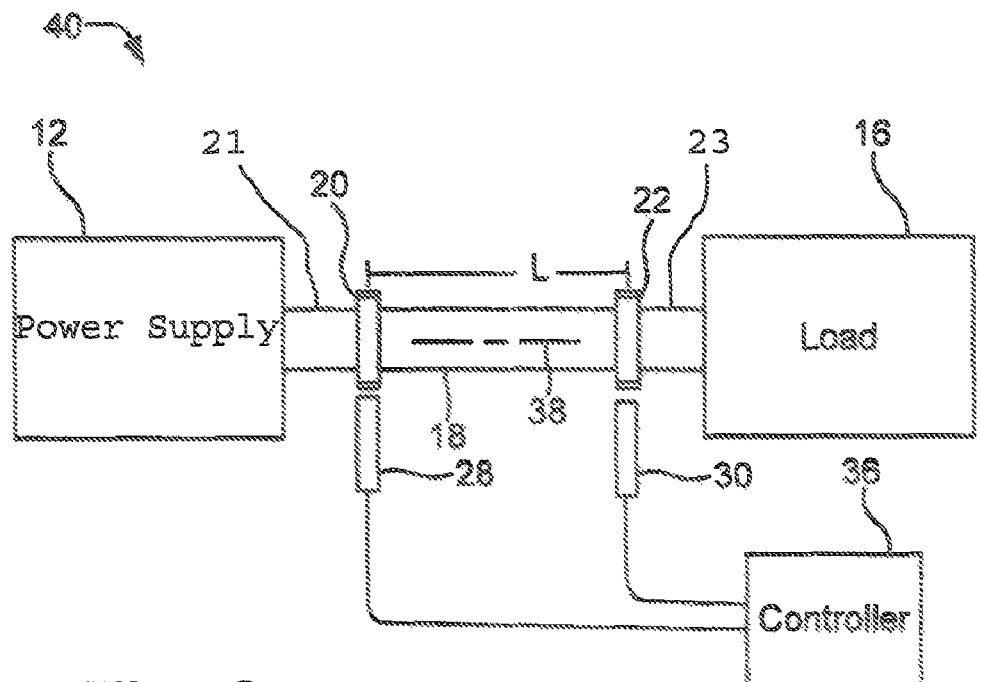
FIG. 2 is a schematical representation of an embodiment of the torque measurement apparatus of the present invention utilized in the tractor of FIG. 1.
Figure 3:
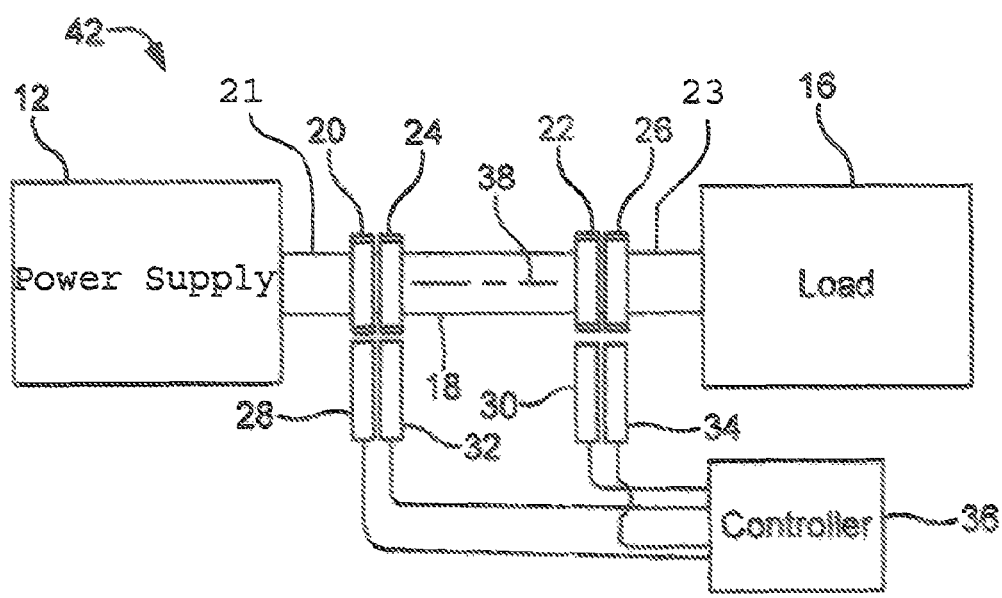
FIG. 3 is a schematical representation of another embodiment of the torque measurement device of the present invention utilized in the tractor of FIG. 1.

Referring now to the drawings, and more particularly to FIGS. 1-3, there is illustrated a ground engaging vehicle 10 also known as a tractor 10. Tractor 10 includes an engine/transmission system 12 that provides power to wheels 14, which can be understood to be a load 16. Engine/transmission system 12 can be understood to be a power supply device 12 with power therefrom being distributed to mechanical loads throughout tractor 10 and even by way of linking power shafts to other agricultural equipment, not shown. For illustration purposes and for the ease of understanding, wheels 14 can be considered a load 16, although it is to be further understood that load 16 can be any mechanical load that is being driven by engine transmission system 12.

Schematical representations in FIGS. 2 and 3 respectively illustrate two embodiments of torque measurement system 40 or 42 with a power supply 12 conveying a mechanical power to a load 16 by way of a shaft 18. The shaft comprises a first end 21 and second end 23. Torque is supplied by power supply 12 and is transmitted by shaft 18. Toothed wheels 20, 22, 24 and 26 are positioned as shown in the two embodiments with the embodiment of FIG. 2 utilizing only toothed wheels 20 and 22. Toothed wheels 20, 22, 24 and 26 are to be understood to be a detectable feature and do not necessarily have to be toothed wheels, which are described herein for ease of explanation of the present invention. Detectable features 20, 22, 24 and 26 can also be, for example, optical or magnetic sources associated with separate longitudinal positions along shaft 18.

Sensors 28 and 30 are respectively located with toothed wheels 20 and 22 in FIG. 2. In FIG. 3 sensors 32 and 34 are additionally respectively associated with toothed wheels 24 and 26. Sensors 28, 30, 32 and 34 are communicatively coupled to controller 36 for receiving signals generated by the interaction of toothed wheels 20, 22, 24 and 26 with corresponding sensors 28, 30, 32 and 34.

As torque is supplied by way of power supply 12 to load 16 by way of shaft 18, shaft 18 is rotated about a longitudinal axis 38 causing toothed wheels 20 and 22 to rotate therewith. As the load is increased by load 16, additional power is supplied by way of power supply 12, shaft 18 flexes about longitudinal axis 38 causing a variation in the signals from sensors 28 and 30, which results in detectable flexing of shaft 18 that is then measured and the stiffness of shaft 18 is utilized in the computation of the torque being delivered through shaft 18. The computation is undertaken by controller 36, which for ease of understanding is a controller/computer that is associated with tractor 10 and has a relatively low sampling rate inherent with such controllers. Controller 36 is utilized for controlling various systems and displays in tractor 10 and is normally not dedicated to just the measurement of torque as illustrated in FIGS. 2 and 3. Although typically controller 36 is being utilized for other functions on tractor 10, it is to be understood that a separate controller 36 is also contemplated by the inventors.

A measurement of the amount of torque in a drive train component such as shaft 18 allows for the adjustment of the fuel delivery system to the engine and adjustments in transmission of tractor 10 so it can be as productive as possible while protecting the drive train illustrated herein as representative shaft 18 and equipment being driven thereby, which is represented herein as load 16. By being able to cost effectively measure torque on various drive train components this allows the engine to run at a higher power level while the torque being supplied to the various components such as to the power take off (PTO) and the axles of tractor 10 when the torque is being monitored on each of the driven components.

The shifting of the transmission is also improved by knowing how much power is being delivered to the ground or other driven component to thereby optimize the timing of a shift as well as the selection of an optimal gear ratio. Controller 36 can include this information so that if the PTO and/or hydraulics are being used, the shift algorithm can be modified based on power levels being consumed by the different driven components. Additionally, knowing and even recording delivered engine torque to particular driven components can assist in warranty determinations, for example, if a user installs an unauthorized power box that is utilized to boost engine power this can result in damaged driven components, which may then be evaluated as the user's fault. In the past shear bolts or other devices were utilized to fracture when the load became too great to prevent damage to other portions of the driven components. This protection, while effective, results in undesirable downtime as the shear bolts or fractured elements have to be replaced to resume operation. The present invention provides for the use of information from the torque being supplied to the various components so that damage to driven components is prevented by the monitoring and restriction of torque transmitted through various shafts 18.

While shaft torque can be measured by a variety of techniques, such as strain gauges and structural acoustic waves, these techniques require either slip rings or telemetry to obtain a signal from the shaft and are not systems that have an inherent robustness and are not appropriate for off-road vehicles. Magnetostriction and eddy current techniques are robust and less costly, but are too expensive for original equipment manufacturing applications.

Figure 4:
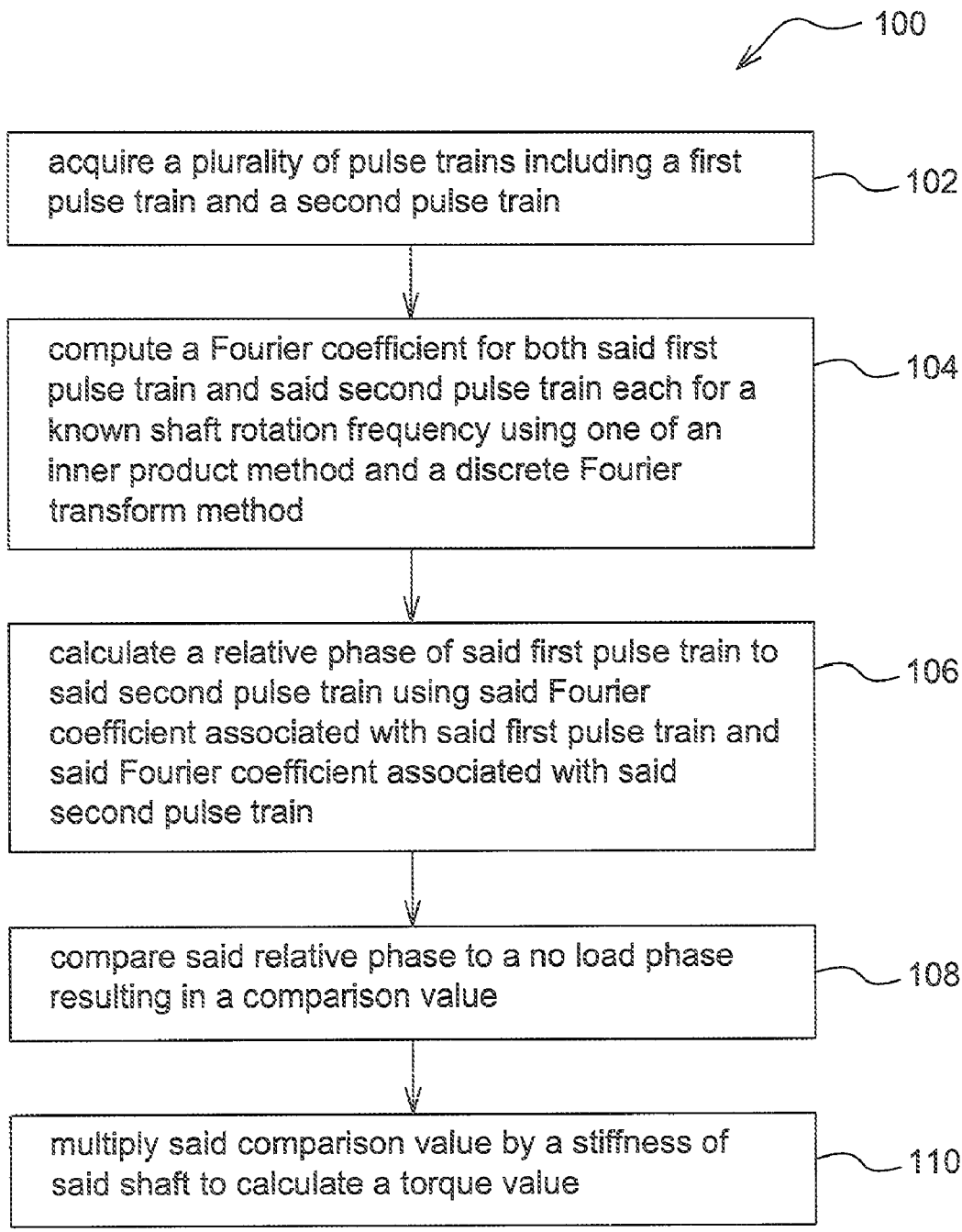
FIG. 4 is a schematical representation of an embodiment of the method utilized in the devices of FIG. 2 or 3 in the tractor of FIG. 1.

Now, additionally referring to FIG. 4, there is shown a method 100 that utilizes the elements of torque measurement system 40 or 42. For ease of understanding torque measurement system 40 will be discussed with all of the attributes and elements associated therewith being equally applicable to torque measurement system 42. Toothed wheels 20 and 22 have a multitude of teeth thereon that alter the magnetic field as they move, which is detected by sensors 28 and 30. Sensors 28, 30, 32 and 34 have a magnetically flux responsive devices that may contain a magnetic source. Sensors 28 and 30 measure the alteration of the magnetic field caused by the passing of the ferrous material of teeth on toothed wheels 20 and 22. As the teeth on toothed wheels 20 and 22 pass sensors 28 and 30 respectively two signals are generated and are transmitted to controller 36. Controller 36 has a sampling rate that is less than twice the tooth pass frequency detected by sensors 28 and 30, as such the signal is aliased. In a typical application the sampling rate of controller 36 is much less than the tooth pass frequency. Controller 36 receives signals from sensors 28 and 30 that can be understood to be two signals that are related substantially in frequency, but with a phase variation that is associated with the torque being applied to shaft 18.

Controller 36 calculates the frequency of at least one of the two toothed wheels as in step 102 of method 100. At step 104, the controller computes a Fourier coefficient for both the fist pulse train and the second pulse train each for a known shaft rotation frequency using one of the inner product method and the discrete Fourier transform method. At step 106, the controller calculates a relative phase of the first pulse train to the second pulse train using the Fourier coefficient associated with the first pulse train and the Fourier coefficient associated with the second pulse train. At step 108, the controller compares the realative phase to a no load phase resulting in comparison value. The no load phase difference is determined as part of an installation or calibration procedure and is determined when rotating shaft 18 without a load applied thereto or alternatively with a predetermined load. At step 110, the controller multiples the comparison value by a stiffness of said shaft to calculate a torque value.

By computing the term of the Fourier series that aligns with the frequency determined at step 102 for each pulse train and multiplying one coefficient by the complex conjugate of the other, the relative phase of the two measured positions along the longitudinal axis 38 of shaft 18 is determined. The advantage of this method is that it employs the current tractor controller that has a limited data sample rate and only two magnetic sensors 28 and 30 thereby resulting a robust low cost torque measurement system 40.

It will now be undertaken to describe how the aliasing method of torque measurement works. First the method of torque computation knowing the phase shifts of the two pulse trains is undertaken then two methods for computing the phase shift are included herein. The first method utilizes the inner product and may be easier to understand. The second is a traditional discrete Fourier transform method and may be more in line with what is often seen performing a frequency analysis. And then a discussion of what may occur when the speed of shaft 18 is at a no phase speed where the algorithm is not capable of determining a phase difference and some of the inventive solutions of that situation, which is inherent when using a low sampling rate controller.

Deflection of a torsionally loaded shaft 18 is $\Theta = TL/JG$ where: $\Theta$=angular deflection [radians]
T=Torque
L=shaft length
J=Polar moment of inertia
G=modulus of rigidity of shaft 18

The shaft stiffness, K is $T/\Theta = JG/L$ and is a constant for any given shaft. While some alternation based upon temperature may be contemplated it is also understood that a temperature sensor may be utilized to modify the foregoing shaft stiffness calculation.

Shaft 18 is outfitted with toothed wheels 20 and 22 separated by a length L. When shaft 18 is rotating at a sufficient speed, two sinusoidal waveforms are generated, one by each of the interaction between toothed wheel 20 and sensor 28 as well as toothed wheel 22 and sensor 30 resulting in the two signals represented by $x_1(t)$ and $x_2(t)$. The general equation is $x_i(t) = x_i \sin(2\pi f t - \phi_i)$.

where: $x_i$=amplitude of sinusoid
f=tooth pass frequency [Hz]
$\phi_i$=phase [radians], and
$f = Z\Omega$ where: Z=number of teeth on the wheels
$\Omega$=shaft speed [Hz]

Toothed wheels 20 and 22 are designed so that magnetic pickups 28 and 30 generate a generally sinusoidal signal. Furthermore, toothed wheels 20 and 22 have a common number of teeth, and when no load is applied to shaft 18, the relative phases of the pulse trains $\phi_0=(\phi_2-\phi_1$ is constant. As shaft 18 winds up, due to torque, then $\phi=(\phi_2-\phi_1$ changes proportionally. If shaft 18 was to twist one full circular pitch of a tooth of the toothed wheels, then $\Theta=2\pi/Z$, that is a $2\pi$ phase shift of the magnetic pickup waveform occurs such that $\phi-\phi_0=2\pi$. The relationship $\Theta=(\phi-\phi_0)/Z$ and $(\phi-\phi_0)=Z\Theta=TLZ/JG$, in solving for torque we obtain $T=(JG/LZ)(\phi-\phi_0)$ or more generally, for any elastic member of stiffness K, $T=(K/Z)(\phi-\phi_0)$.

Controller 36 reads magnetic pickups 28 and 30 calculates the toothed pass frequency of toothed wheels 20 and 22 at step 102. Controller 36 cannot acquire the analog signals fast enough to evaluate the relative phases in the time domain. For example, suppose the tooth pass frequency is 1,500 Hz for wheels 20 and 22, controller 36 would need to sample at more than 15,000 Hz to reasonably determine the phase in the time domain. By working in the frequency domain, the required sampling rate is twice the bandwidth. Since the analog signal frequency is centered at the tooth pass frequency and varies very little from there, one can successfully sample as low as 200 Hz. This signal is highly aliased (one sample for the passing of every 7.5 teeth), but the signal can be completely reconstructed because we know the frequency of the signal.

Hereinafter two methods for determining the phase are presented. The first is referred to as the inner product method, the second computes a single line of the discrete Fourier transform (DFT). Each method assumes the tooth pass frequency $Z\Omega$ is known and that N samples of each pulse train $x_i(n)$ have been acquired at a sample rate of $f_s$.

The inner product method computes the inner product of the vectors $x_i(n)$ and sinusoids of frequency $Z\Omega$. Trigonometric functions, such as the arctangent (herein ATAN 2), are used to obtain the phase.

$$X_i = \sum_{n=0}^{N-1} x_i(n) e^{-j2\pi Z\Omega(n/f_s)} \quad \text{(Known as Fourier coefficients)}$$

$X_i$ is a complex number and the phase of each pulse train is:

$\phi_i$=ATAN $2[Im(X_i),Re(X_i)]$.

The relative phase between the two signals is:

$\phi$=ATAN $2[Im(X_2\overline{X}_1),Re(X_2\overline{X}_1)]$.

Using a Discrete Fourier Transform Method is now described. This method computes the single line of the DFT that bests represents the pulse train. To simplify the equations, three new variables are presented. The first is a frequency ratio, $_\gamma=Z\Omega/f_s$. The second, k, is an integer has to do with how many times the tooth pass frequency is greater than the sampling frequency and is used to identify whether the frequency of interest is a positive or negative frequency in the range of 0 to $(\frac{1}{2})f_s$. The third, m, is an integer between 0 and N/2, identifies which line of the DFT we are interested in computing. The next few lines are pseudo-code for computing the relative phase between the signals.

```
if FLOOR(γ) = CEIL (γ − ½)
  comment: kf_s < ZΩ < (k + ½)f_s
    k = FLOOR(γ)
    m = (γ−k)N
  else
  comment: (k−1/2)f_s < ZΩ < kf_s
    k = CEIL(γ)
    m = (k− γ)N
``` end if $$X_i = \sum_{n=0}^{N-1} x_i(n) \, e^{-j2\pi(mn/N)}$$

$\phi$ = ATAN2[lm($X_2\underline{X}_1$), Re($X_2\overline{X}_1$)]

Dealing with the no phase speeds previously discussed, there is inherent to the low sampling rate technique for computing torque by using aliased signals, a finite number of predictable speeds wherein the phase is not known. Examining the first summation equation we see that when $2Z\Omega/f_s$ is an integer then $e^{-j2\pi Z\Omega(n/fs)}$ is real for all n and no phase information is obtained. This condition is exactly the same as when m=0 or N/2 in the second summation equation. Since the number of teeth on the toothed wheels and the sample rates may be fixed, the spacing of the phase dropouts is $\Delta\Omega=f_s/2Z[Hz]=30f_s/Z$ [rpm].

To get around this problem, in specified speed ranges one can choose another sampling rate or choose to observe the pulse train from a second pair of toothed wheels 24 and 26 with different tooth numbers from toothed wheels 20 and 22. The selection of the number of teeth on the two sets of toothed wheels is carefully chosen so that the problematic zones are not overlapping. FIG. 3 shows a schematic of a shaft with two pairs of toothed wheels 20 and 22, and 24 and 26, along with sensors 28, 30, 32 and 34 for resolving the latent phase.

Another way to solve this problem is to use at least two separate sampling rates with the two rates being carefully chosen so that the problematic zones are not overlapping. This is exemplified in step 104, where a sampling rate is selected for a better signal to noise ratio. For example, if the sampling rate is at 200 Hz and the rotation of shaft 18 is at a rotation speed such that the a no phase speed is experienced then the controller shifts to another sampling frequency such as 175 Hz to thereby allow the system to then make a torque measurement.

An additional consideration of the signal processing contemplated by the inventor is the use of a window function applied to the time acquired data by controller 36, the window being zero-valued outside of a predetermined interval. For example, a function that is constant inside the predetermined interval and zero elsewhere is referred to as a rectangular window, which describes the shape of the graphical representation thereof. When the time acquired data is multiplied by the window function, the product is then zero outside of the predetermined interval. In addition to the use of a rectangular window technique the use of a shaped window, such as a Hamming function or a Hann function may be used as the window. These functions are useful to help resolve the signals and to improve accuracy of the measurements.

Having described the preferred embodiment, it will become apparent that various modifications can be made without departing from the scope of the invention as defined in the accompanying claims.

The invention claimed is:

1. A method for measuring torque using a torque measurement apparatus, wherein the method comprises the steps of:
   providing a rotatable shaft having a longitudinal axis, a first end and a second end, said first end connected to said power supply, said second end connected to said load;
   providing a first detectable feature associated with a first longitudinal position of said shaft;

providing a second detectable feature associated with a second longitudinal position of said shaft;

providing a plurality of sensors including a first sensor and a second sensor, said first sensor proximate to said first detectable feature, said second sensor proximate to said second detectable feature;

producing a first signal, via said first sensor, as said rotatable shaft rotates about said longitudinal axis;

producing a second signal, via said second sensor, as said rotatable shaft rotates about said longitudinal axis;

sampling said first and second signals, via said controller, such that said first and second signals are aliased;

utilizing said controller to calculate a first Fourier coefficient for said first signal and a second Fourier coefficient for said second signal using one of an inner product method and a discrete Fourier transform method;

calculating a relative phase, via said controller, between said first and second signals using said first and second Fourier coefficients; and utilizing said controller for calculating said shaft torque using said relative phase.

2. The method of claim 1, wherein said first detectable feature and said second detectable feature are substantially similar toothed disks mounted about said rotatable shaft and fixed for rotation therewith.

3. The method of claim 2, wherein said first sensor and said second sensor are magnetic flux sensitive devices.

4. The method of claim 2, further comprising:

providing a third detectable feature associated with a third longitudinal position of said shaft;

providing a fourth detectable feature associated with a fourth longitudinal position of said shaft; and providing a third sensor and a fourth sensor, said third sensor proximate to said third detectable feature, said fourth sensor proximate to said fourth detectable feature, said third sensor producing a third signal and said fourth sensor producing a fourth signal as said rotatable shaft rotates about said longitudinal axis.

5. The method of claim 4, wherein:

said third and fourth detectable features are substantially similar disks each comprising a number of teeth mounted about said rotatable shaft and fixed for rotation therewith;

said number of teeth on said third and fourth detectable features is different than said number of teeth on said first and second detectable features; and said number of teeth on said first and second detectable features results in a first set of no phase speeds, said number of teeth on said third and fourth detectable features results in a second set of no phase speeds, and said first and second sets of no phase speeds do not overlap.

6. The method of claim 1, wherein said sampling comprises sampling said first and second at a first sampling rate resulting in a first set of no phase speeds, at a second sampling rate resulting in a second set of no phase speeds, and said first and second sets of no phase speeds do not overlap.

7. The torque measurement method of claim 1, wherein said controller is associated with a work machine, and said controller is not dedicated to just measuring torque.

* * * * *